United States Patent [19]
Traver et al.

[11] Patent Number: 5,178,668
[45] Date of Patent: Jan. 12, 1993

[54] AQUEOUS WATER REPELLENT COMPOSITIONS

[75] Inventors: Frank J. Traver, Troy; Kimberlie A. Schryer, Clifton Park, both of N.Y.

[73] Assignee: General Electric Company, Waterford, N.Y.

[21] Appl. No.: 755,897

[22] Filed: Sep. 6, 1991

[51] Int. Cl.$^5$ .............................................. C08G 77/04
[52] U.S. Cl. .................................... 106/2; 106/287.11; 106/287.12; 427/387; 428/447; 428/452; 528/25; 528/28; 528/30; 525/102
[58] Field of Search ................... 106/2, 287.11, 287.12; 427/387; 428/446, 452; 528/25, 28, 30; 525/102

[56] References Cited

U.S. PATENT DOCUMENTS

| | | | |
|---|---|---|---|
| 3,456,570 | 5/1976 | Bosch et al. | 428/446 |
| 3,589,917 | 7/1971 | Hedlund | 106/287.11 |
| 3,955,985 | 5/1976 | Bosch et al. | 106/2 |
| 3,956,570 | 5/1976 | Bosch et al. | 428/446 |
| 4,377,608 | 3/1983 | Daudt et al. | 427/356 |
| 4,377,675 | 3/1983 | Daudt et al. | 528/25 |
| 4,400,326 | 8/1983 | Daudt et al. | 260/429 R |
| 4,404,306 | 9/1983 | Daudt et al. | 524/262 |
| 4,620,878 | 11/1986 | Gee | 106/287.15 |
| 4,717,599 | 1/1988 | Merrill | 427/387 |

*Primary Examiner*—Mark L. Bell

[57] ABSTRACT

An aqueous composition for rendering masonry and wood surfaces water repellent is provided, comprising an aqueous mixture containing an alkali metal aminoorgano-functional siliconate and at least one alkali metal organosiliconate.

29 Claims, No Drawings

AQUEOUS WATER REPELLENT COMPOSITIONS

BACKGROUND OF THE INVENTION

This invention relates to water repellent compositions. More particularly, this invention relates to water repellent compositions containing aqueous solutions of alkali metal organosiliconates for use on construction materials.

The use of aqueous solutions of alkali metal methyl siliconates, alkali metal ethyl siliconates, alkali metal propyl siliconates, or alkali metal phenyl siliconates in water repellent compositions for construction materials is known in the art. Reference is made, for example, to U.S. Pat. Nos. 3,955,985 and 3,956,570, both to Bosch et al.

U.S. Pat. No. 3,955,985 (sometimes referred to hereinafter as Bosch '985) discloses water repellent compositions for use on building materials, the compositions containing an aqueous solution of alkali metal alkyl and/or phenyl siliconates, an organic aqueous soluble complexing or chelating agent, and an aqueous miscible monovalent alcohol and/or ketone. Examples of the complexing or chelating agents are alkali metal salts of aminopolycarboxylic acids and polyamines such as B,B'-diaminodiethylamine and B,B',B''-triaminotriethylamine. According to Bosch '985, the compositions taught therein will impart water repellency to masonry surfaces containing free lime without having to pretreat the surface prior to application of the water repellent composition. Furthermore, according to Bosch '985, it has been impossible to form stable aqueous solutions of ethyl, propyl, or phenyl siliconates. However, the invention therein was based on the discovery that stable aqueous solutions of such siliconates could be obtained by adding to the siliconates a complexing or chelating agent and an aqueous miscible monovalent alcohol and/or ketone.

U.S. Pat. No. 3,956,570 (sometimes referred to hereinafter as Bosch '570) discloses a method for imparting water repellency to construction materials which comprises treating the construction materials with a solution containing alkali metal organosiliconates of which at least 10 percent of the alkali metal organosiliconates are alkali metal propylsiliconates. Other organo groups which may be present in the alkali metal organo-siliconates are monovalent organic groups, preferably monovalent aliphatic hydrocarbon radicals. The compositions disclosed in Bosch '570 are said to impart water repellency to masonry surfaces containing free lime and having a pH value of at least 8 without having to pretreat the surface prior to application of the water repellent composition. According to Bosch '570, it had been through that there were no differences in the effectiveness of the various hydrocarbon radicals in the alkali metal organosiliconates in regard to imparting water repellency to construction materials. However, according to the patent, it was surprisingly found that alkali metal propylsiliconates imparted substantially better water repellent properties to construction materials having a pH value of at least 8 than alkali metal methyl-, ethyl-, or vinylsiliconates.

Although stable aqueous water repellent compositions containing water-soluble siliconates are known in the art, it is continually desirable to provide alternative aqueous siliconate-containing water repellent compositions, particularly, alternative water repellent compositions which are generally stable and more aesthetically pleasing to consumers, who tend to prefer yellow translucent water repellent compositions over milky-white water repellent compositions.

It is also continually desirable to provide alternative aqueous siliconate-containing water repellent compositions which will impart water repellency to masonry surfaces containing free lime without having to pretreat the surface prior to application of the water repellent composition.

It is further desirable to provide aqueous siliconate-containing water repellent compositions which will impart water repellency to wood surfaces as well as to masonry surfaces.

The present invention is based on the discovery that translucent aqueous siliconate-containing water repellent compositions having the above characteristics can be obtained from mixtures of aminoorgano-functional alkali metal siliconates and certain alkali metal organosiliconates.

SUMMARY OF THE INVENTION

In one of its aspects, the present invention provides an aqueous compositions for rendering masonry and wood surfaces water repellent, comprising by weight:

(A) from about 5 to about 70 parts of a mixture comprising by weight:
  (1) from about 5 to about 50 parts of an alkali metal aminoorgano-functional siliconate having the general formula

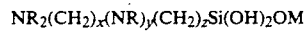
  $NR_2(CH_2)_x(NR)_y(CH_2)_zSi(OH)_2OM$ or a quaternary amine salt thereof, wherein each R is independently hydrogen or a monovalent hydrocarbon radical having from 1 to about 6 carbon atoms; M is an alkali metal selected from sodium, potassium, lithium, rubidium, or cesium; x is a number in the range of 0 to 5; y is 0 or 1, with the proviso that if x is 0, y is 1; z is a number in the range of 1 to 6; and x+z is a number in the range of 1 to 6;
  (2) from about 95 to about 50 parts of at least one alkali metal organosiliconate selected from (i) monomer compounds of the general formula $R^1Si(OH)_2OM$, or (ii) polymer compounds containing units of the general formula $R^1(OM)SiO_{2/2}$, wherein $R^1$ is a monovalent hydrocarbon radical having from 1 to about 6 carbon atoms, and M is an alkali metal selected from sodium, potassium lithium, rubidium, or cesium, the sum of (A)(1) and (A)(2) being 100 parts by weight; and
(B) from about 30 to about 95 parts of water, the sum of (A) and (B) being 100 parts by weight.

In another aspect of the present invention, there is provided an aqueous composition for rendering masonry and wood surfaces water repellent, containing an alkali metal aminoorgano-functional siliconate and at least one alkali metal organosiliconate, wherein at lest one alkali metal organosiliconate is substantially insoluble in water; a water-soluble organic solvent; and water.

DETAILED DESCRIPTION OF THE INVENTION

In one embodiment, the present invention is directed to an aqueous water repellent composition containing (A) a mixture of (1) an alkali metal aminoorganofunctional siliconate or quaternary amine salt thereof and (2)

at least one water-soluble alkali metal organosiliconate, and (B) water.

The alkali metal aminoorganofunctional siliconate (A)(1) has the general formula $$NR_2(CH_2)_x(NR)_y(CH_2)_zSi(OH)_2OM \quad (I)$$

wherein each R is independently hydrogen or a monovalent hydrocarbon radical having from 1 to about 6 carbon atoms; M is an alkali metal selected from sodium, potassium, lithium, rubidium, or cesium; x is a number in the range of 0 to 5; y is 0 or 1, with the proviso that if x is 0, y is 1; z is a number in the range of 1 to 6; and x+z is a number in the range of 1 to 6.

Examples of monovalent hydrocarbon radical represented by R in Formula (I) include monovalent aliphatic hydrocarbon radicals, monovalent unsaturated hydrocarbon radicals, and phenyl radicals. The preferred monovalent hydrocarbon radicals represented by R are methyl, ethyl, and phenyl, with methyl being most preferred.

Most preferably, R is hydrogen.

In formula (I), M is preferably sodium or potassium, and most preferably is potassium.

In preferred embodiments of the alkali metal aminoorganofunctional siliconate represented by Formula (I), x is 2, y is 1, and z is 3.

Thus, the preferred alkali metal aminoorganofunctional siliconate for use in the present invention has the formula:

$$NH_2(CH_2)_2(NH)(CH_2)_3Si(OH)_2OK \quad (II)$$

Quaternary amine salts of the alkali metal aminoorganofunctional siliconates of formulae (I) and (II) may be used in place of the alkali metal aminoorganofunctional siliconates. These salts generally have the formula:

$$[N+R^2(CH_2)_xSiO_{3/2}]OH- \quad (III)$$

wherein $R^2$ is a monovalent hydrocarbon radical having from 1 to about 6 carbon atoms and x is as defined hereinabove. Preferably, $R^2$ is methyl or ethyl.

Generally, the alkali metal siliconates used in the compositions of this invention are prepared by conventional techniques known in the art, such as by the hydrolysis of the appropriate aminoorgano-functional trichlorosilanes or trialkoxysilanes in the presence of water and thereafter dissolving the resulting polysiloxanes in alkali metal hydroxide solutions, preferably a sodium or potassium hydroxide solution.

The quaternary amine salts of formula (III) may be prepared, for example, by reacting the corresponding aminoorgano-functional trialkoxysilane such as $N(R^2)_2(CH_2)_x(NR)_y(CH_2)_zSiO(OR)_3$ with a halogenated hydrocarbon of the formula $R^2X$, wherein X is a halogen, preferably chlorine, and R, $R^2$, x, y, and z are as previously defined, and then hydrolyzing the resulting reaction product.

Component (A)(2) is at least one alkali metal organosiliconate selected from (i) monomer compounds of the general formula $$R^1Si(OH)_2OM \quad (IV)$$

or (ii) polymer compounds containing units of the general formula $$R^1(OM)SiO_{2/2} \quad (V)$$

wherein $R^1$ is a monovalent hydrocarbon radical having from 1 to about 6 carbon atoms, and M is an alkali metal as described above.

In formulae (IV) and (V) for the alkali metal organosiliconate (A)(2), $R^1$ is preferably methyl, ethyl, or phenyl, and most preferably methyl or phenyl.

Most preferably, (A)(2) is a potassium methyl siliconate or a blend of potassium methyl siliconate and potassium phenyl siliconate.

Generally, the alkali metal siliconates (A)(2) are prepared by conventional techniques known in the art, such as by the hydrolysis of the appropriate organofunctional trichlorosilanes or trialkoxysilanes in the presence of water and thereafter dissolving the resulting polysiloxanes in alkali metal hydroxide solutions, preferably a sodium or potassium hydroxide solution.

The composition of this invention contains from about 5 to about 70 parts, preferably from about 5 to about 25 parts, and most preferably from about 5 to about 10 parts by weight of (A) and from about 95 to about 30 parts, preferably from about 95 to about 75 parts, and most preferably from about 95 to about 90 parts by weight of (B), the sum of (A) and (B) being 100 parts by weight.

In (A), (A)(1) is present in an amount within the range of from about 5 to about 50, preferably from about 5 to about 20, and most preferably from about 5 to about 10 parts by weight; and (A)(2) is present in an amount within the range of from about 95 to about 50, preferably from about 95 to about 80, and most preferably from about 95 to about 90 parts by weight, the sum of (A)(1) and (A)(2) being 100 parts by weight.

In another embodiment, the present invention is directed to an aqueous water repellent composition, comprising by weight:

(I) from about 2 to about 60 parts of a mixture comprising by weight:
  (1) from about 5 to about 50 parts of an alkali metal aminoorganofunctional siliconate as described previously herein;
  (2) from about 95 to about 50 parts of at least one alkali metal organosiliconate selected from (i) monomer compounds of the general formula $R^2Si(OH)_2OM$; (ii) polymer compounds comprising units of the general formula $R^2(OM)SiO_{2/2}$, or (iii) polymer blends comprising by weight:
    (a) from about 70% to about 90% of polymer compounds comprising units of the general formula $(CH_3)(OM)SiO_{2/2}$;
    (b) from about 3% to about 20% of polymer compounds comprising units of the general formula $(CH_3)_2SiO_{2/2}$; and
    (c) from about 5% to about 27% of polymer compounds comprising units of the general formula $[(CH_3)(CH_2)_5](OM)SiO_{2/2}$;
  wherein $R^2$ is a monovalent hydrocarbon radical having from 1 to about 8 carbon atoms; M is alkali metal selected from sodium, potassium, lithium, rubidium, or cesium, the sum of (I)(1) and (I)(2) being 100 parts by weight;
(II) from about 1 to about 20 parts of a water-soluble organic solvent selected from aliphatic monovalent alcohols having from 1 to 4 carbon atoms or ketones having from 3 to 5 carbon atoms; and (III) from about 20 to about 97 parts of water, the sum of (I), (II), and (III) being 100 parts by weight.

The alkali metal aminoorganofunctional siliconates or quaternary amine salts thereof of (I)(1) are the same as those described previously herein in connection with (A)(1), with the same preferences.

In the alkali metal organosiliconate (I)(2), $R^2$ can be any of the radicals represented by $R^1$ above and can also represent heptyl and octyl radicals, which tend to be insoluble or partially insoluble in water.

The polymer blend of (II)(2)(iii) preferably comprises by weight:

(a) from about 75% to about 85% and most preferably about 79.5% of polymer compounds comprising units of the general formula $(CH_3)(OM)SiO_{2/2}$;
(b) from about 5% to about 10% and most preferably about 7.0% of polymer compounds comprising units of the general formula $(CH_3)_2SiO_{2/2}$; and
(c) from about 5% to about 20% and most preferably about 13.5% of polymer compounds comprising units of the general formula $[(CH_3)(CH_2)_5](OM)SiO_{2/2}$.

M is an alkali metal selected from sodium, potassium, lithium, rubidium, or cesium, preferably sodium or potassium and most preferably potassium.

Alkali metal organosiliconates wherein the organo group is an alkyl radical containing more than 6 carbon atoms and alkali metal organosiliconates derived from dimethyldimethoxysilanes tend to be insoluble or only partially soluble in water. When these types of siliconates are used in aqueous solutions, a water-soluble organic solvent is generally necessary to increase the solubility of such siliconates in water.

The amount of the siliconate mixture (I) in the composition of this invention is from about 2 to about 60, preferably from about 5 to about 14, and most preferably from about 5 to about 9, parts by weight based on the combined weight of (I)-(III).

In (I),(I)(1) is present in an amount within the range of from about 5 to about 50, preferably from about 5 to about 20, and most preferably from about 5 to about 10 parts by weight; and (I)(2) is present in an amount within the range of from about 95 to about 50, preferably from about 95 to about 80, and most preferably from about 95 to about 90 parts by weight, the sum of (I)(1) and (I)(2) being 100 parts by weight.

Examples of water-soluble organic solvents (II) suitable for use in this invention include lower aliphatic alcohols having from 1 to 4 carbon atoms, e.g., methanol, ethanol, n-propanol, and is isopropanol and the like; and ketones having from 3 to 5 carbon atoms such as acetone, methylethylketone, 2-pentanone and the like. Methanol and isopropanol are preferred.

The amount of the organic solvent (II) is in the range of from about 1 to about 20, preferably from about 1 to about 10, and most preferably from about 1 to about 5, parts by weight based on the combined weight of (I)-(III).

The amount of water (III) is in the range of from about 60 to about 94, preferably from about 85 to about 94, and most preferably from about 90 to about 94, parts by weight based on the combined weight of (I)-(III).

The total weight of (I)-(III) is 100 parts by weight.

The organic solvent (II) in this embodiment of the composition of this invention is volatile, which makes it somewhat undesirable from an environmental standpoint. It has been found that if the alkali metal organosiliconate (I)(2) is the polymer blend (I)(2)(iii) described above, a nonionic surfactant, which is not volatile, can be used in place of the organic solvent to increase solubility of the siliconates in water without a reduction in the water repellent properties of the compositions. Thus, another embodiment of the present invention is directed to a composition comprising by weight:

(A') from about 1 to about 10 parts of a mixture comprising by weight:
  (I') from about 5 to about 50 parts of the alkali metal aminoorganofunctional siliconate of general formula (I) described previously herein or a quaternary amine salt thereof;
  (II') from about 95 to about 50 parts of the alkali metal organosiliconate polymer blend described hereinabove as (I)(2)(iii); the sum of (A')(I') and (A')(II') being 100 parts by weight;
(B') from about 1 to about 10 parts of a non-ionic surfactant; and
(C') from about 80 to about 98 parts of water, the sum of (A'), (B'), and (C') being 100 parts by weight.

However, the surfactant does adversely affect the water repellent properties of the composition if the other alkali metal organosiliconates discussed hereinabove are used as (A')(II').

(A') is preferably present in an amount of from about 5 to about 10 parts by weight and most preferably from about 5 to about 7 parts by weight. (B') is preferably present in an amount of from about 1 to about 5 parts by weight and most preferably from about 1 to about 3 parts by weight. (C') is preferably present in an amount of from about 85 to about 94 parts by weight and most preferably from about 90 to about 94 parts by weight.

Suitable non-ionic surfactants for use herein are those known in the art and include, for example, the octylphenoxypolyethoxy ethanols, trimethylnonyl polyethylene glycol ethers and polyethylene glycol ethers of linear 11-15 carbon atoms containing alcohols, and the nonionic ethoxylated tridecyl ethers. For other suitable non-ionic surfactants, reference is made to U.S. Pat. No. 4,620,878 (Gee), which is hereby incorporated by reference herein.

The preferred non-ionic surfactants for use herein are the octylphenoxypolyethoxy ethanols.

The water repellent compositions of this invention are prepared by diluting the alkali metal aminoorganofunctional siliconates, alkali metal organosiliconates, and if present, the organic solvents, with water.

The water repellent compositions of this invention can be applied to the surfaces of the masonry or wood materials which are to be made water repellent by any conventional means known in the art such as by brushing, spraying, or immersion.

Examples of masonry materials include brick, concrete, cinder block, mortar, tile, stone, stucco, sandstone, limestone, and equivalent materials.

In order that those skilled in the art will be better able to practice the present invention, the following examples are given by way of illustration and not by way of limitation. All parts and percentages are by weight, unless otherwise noted.

Experimental

The compositions prepared in Examples 1 and 7 below represent the most preferred embodiments of the compositions of this invention.

The following code names will be used for the silanes used in the examples below:

Octyl TMS—octyltrimethoxysilane
Phenyl TMS—phenyltrimethoxysilane
Methyl TMS—methyltrimethoxysilane
Silane Blend—a blend containing 79.5% by weight of methyltrimethoxysilane, 7.0% by weight of dimethyldimethoxysilane, and 13.5% by weight of hexyltrimethoxysilane
AEAPTMS—aminoethylaminopropyltrimethoxysilane

EXAMPLE 1

222.1 Grams of AEAPTMS (1 mole), 408 grams of Methyl TMS (3 moles) and 50 grams of NaOH were added to a three liter round bottom flask equipped with condensor, heating mantle, thermowatch controller, thermometer, take off/reflux head, y-tube, addition funnel and nitrogen blanketing capability. To 456 grams of water were added 110 grams of NaOH (4 moles total used in the example) and the NaOH dissolved. The NaOH solution was slowly added to the vessel containing the silanes and NaOH pellets, the addition of the NaOH solution resulting in the generation of heat. Once all the water was added to the vessel, the reaction mixture was heated to 80° C. for an hour. The vessel was heated to 100° C. to remove methanol generated during the hydrolysis reaction and some of the water. Then, 200 grams of water were added to the reaction mixture and, after drying at 150° C. for 45 minutes, the final mixture had a solids content of 46%.

The final product was completely soluble in water.

EXAMPLE 2

To a vessel like that described in Example No. 1 above, there were added 820 grams of Silane Blend and 100 grams of KOH pellets. Addition of the pellets resulted in a mild exotherm. In another container there were added 228 grams of KOH pellets followed by the slow addition of water. There was the typical exotherm expected from this type of solution preparation. The KOH solution was slowly added to the vessel containing the Silane Blend and KOH pellets. There was a significant exotherm with refluxing of the methanol generated by the basic hydrolysis of the methoxy silanes. After the addition of aqueous KOH solution, there were added 389 grams of water. The vessel was then heated to about 100° C., resulting in the removal of methanol and some water. The resulting siliconate solution had a solids content of 65.5%, which was then cut to 50% solids with water. A slight precipitation was noted, so 25 more grams of KOH were added and the material recooked.

The final product was not dilutable in water alone, but required the presence of an alcohol such as methanol or isopropanol in order to be dilutable with water and alcohol.

EXAMPLE 3

To a vessel equipped like that described in Example 1 above there were added 250 grams of Octyl TMS and 20 grams of KOH. In another container a solution of 40 grams of KOH in 200 grams of water was prepared. The aqueous KOH was added to the OctylTMS/KOH pellet slurry in the reaction vessel. There was an exotherm and the methanol produced during the reaction was removed. The resultant product was not soluble in water alone, but was soluble in isopropanol and water.

EXAMPLE 4

The procedure followed in Example 1 above was repeated except that 160 grams of NaOH and 656 grams of water were used. The methanol formed during the hydrolysis reaction was removed and solids content of the resulting solution was adjusted to 45%. The final siliconate solution was fully soluble in water.

EXAMPLE 5

To a vessel equipped like that in Example 1, there were added 413.1 grams of Silane Blend and 111 grams of AEAPTMS. To another vessel there were added 211 grams of KOH pellets and 506 grams of water. The aqueous KOH solution was then added slowly to the vessel containing the mixed silanes. After the fist 40 grams of aqueous KOH were added, an exotherm occurred and and a transient gel appeared. The remaining aqueous KOH was added and the gel dissolved into the solution. The vessel was heated to a temperature of about 90° C. and the methanol was refluxed for an hour and then removed. The solids content of the resultant siliconate product was adjusted to 45% solids with water.

The resultant solution was not water soluble, but required the presence of alcohol (either methanol or isopropanol work acceptable well) to form a dilute aqueous solution. It was, also, found that if 5 to 10% by weight of surfactant such as octylphenoxypolyethoxyethanol (30 mols) were added to the concentrate, the solution was then water reducible (disperses in water) without the need for additional carriers like alcohol.

EXAMPLE 6

To a vessel equipped like that in Example 1, there were added 265 grams of AEAPTMS and 487 grams of Silane Blend. To another vessel there were added 267 grams of KOH pellets and 326 grams of water to form an aqueous KOH solution. The aqueous KOH solution was slowly added to the mixture of silanes in the reaction vessel. There was an exotherm and the pot temperature was controlled by the addition rate of the aqueous KOH solution and the refluxing of methanol, which was produced during the base catalyzed hydrolysis of the methoxysilanes. After all the aqueous KOH solution was added, there was added an additional 385 grams of water and 30 grams of KOH. The reaction mixture was then heated to about 100° C. and methanol removed.

The final siliconate solution was not soluble in water alone but was soluble in a water-alcohol solution.

EXAMPLE 7

To a reaction vessel like that of Example 1, there were added 222 grams of AEAPTMS, 340 grams of Methyl TMS and 68 grams of Phenyl TMS. In another container a KOH solution was prepared from 224 grams of KOH and 274 grams of water. The aqueous KOH solution was then slowly added to the reaction vessel containing the mixture of silanes. There was an exotherm, which increased the reaction vessel mixture temperature from about 30° C. to 75° C. After the aqueous KOH solution addition was complete, the vessel was heated to 100° C., resulting in the removal of about 300 grams of methanol. A total of 435 grams of methanol and water were removed (including the 300 grams previously mentioned). An additional 80 grams of water were then added and the resulting solids content was 52.6%.

The final siliconate solution was fully soluble in water and did not require a co-solvent or additional surfactant to disperse in water.

EXAMPLE 8

Example 8 illustrates the preparation of an aqueous sodium methylsiliconate solution within the scope of the present invention.

EXAMPLES 9-13 and COMPARATIVE EXAMPLES A and B

In Examples 9-13 and Comparative Examples A and B, the water repellency of concrete treated with compositions within the scope of this invention is compared to the water repellency of untreated concrete (Comparative Example A) and of concrete treated with a water repellent composition of the prior art (Comparative Example B). The water repellent properties of the various compositions were measured by means of modified ASTM C97-83 method for measuring water absorption of concrete.

In Example 9, the water repellent solution prepared in Example 8 was used at a solids content of 5% by weight.

In Example 10, the water repellent solution prepared in Example 8 was used at a solids content of 10% by weight.

In Example 11, the water repellent solution prepared in Example 7 was used at a solids content of 5% by weight.

In Example 12, the water repellent solution prepared in Example 1 was used at a solids content of 5% by weight.

In Example 13, the water repellent solution prepared in Example 1 was used at a solids content of 10% by weight.

In Comparative Example A, a water repellent composition was not used and the concrete was left untreated.

In Comparative Example B, a water repellent composition within the scope of U.S. Pat. No. 4,717,599 to Merrill (which is hereby incorporated by reference herein) was used. This composition contained 70 parts by weight of a methylmethoxypolysiloxane resin (available from General Electric Company under the trademark DF104) and 30 parts by weight of a 60% solids in xylene resin composed of $(CH_3)_3SiO_{\frac{1}{2}}$ units and $SiO_{4/2}$ units in a ratio of 0.6:1 diluted to 10% solids with mineral spirits.

Concrete samples of 25 mm (width × 25 mm (height) × 50 mm (length) were dried in a 100° C. oven for 24 hours and weighed. This weight is designated as "initial weight". The water repellent composition was then applied to the concrete sample by dip coating. The resulting treated concrete sample was then dried at 25° C. and 50% relative humidity for 24 hours and weighed again. This weight is designated as "weight 24 hr dry".

Each dried coated concrete slab was then immersed in water for 24 hours, 48 hours, 72 hours, and 7 days, respectively, and then weighed, in order to determine the various water-absorption values by means of the increase in the concrete's weight. The weights measured after the various immersion times are designated as "Weight-24 hour soak", "Weight-48 hour soak", "Weight-72 hour soak", and "Weight-7 day soak", respectively.

The weight data for the coated concrete samples prepared in Examples 9-13 and Comparative Examples A and B are shown in Table 1 below.

TABLE 1

| | Examples 9-13 and Comparative Examples A and B: Weight Values | | | | | |
|---|---|---|---|---|---|---|
| Example No. | Initial Weight (grams) | Weight-24 hour dry (grams) | Weight-24 hour soak (grams) | Weight-48 hour soak (grams) | Weight-72 hour soak (grams) | Weight-7 day soak (grams) |
| 9  | 108.1 | 108.4 | 109.3 | 109.9 | 110.4 | 114.7 |
| 10 | 108.8 | 109.3 | 110.2 | 111.0 | 112.2 | 116.7 |
| 11 | 105.8 | 106.3 | 107.5 | 108.3 | 110.4 | 114.5 |
| 12 | 108.2 | 108.7 | 109.8 | 110.5 | 111.7 | 115.7 |
| 13 | 108.3 | 108.8 | 110.3 | 111.6 | 112.8 | 116.8 |
| A  | 106.7 | 106.8 | 114.6 | 114.9 | 115.0 | 115.2 |
| B  | 107.0 | 107.3 | 108.5 | 108.9 | 109.4 | 110.2 |

The water absorption data for the coated concrete samples prepared in Examples 9-13 and Comparative Examples A and B are shown in Table 2 below.

TABLE 2

| | Examples 9-13 and Comparative Examples A and B: Water Absorption Values (% increase in weight) | | | |
|---|---|---|---|---|
| Example No. | After 24 hour soak | After 48 hour soak | After 72 hour soak | After 7 day soak |
| 9  | 0.79% | 1.32% | 1.81% | 5.81% |
| 10 | 0.82% | 1.59% | 2.68% | 6.74% |
| 11 | 1.10% | 2.04% | 3.79% | 7.65% |
| 12 | 0.98% | 1.66% | 2.74% | 6.43% |
| 13 | 1.38% | 2.54% | 3.71% | 7.32% |
| A  | 7.30% | 7.55% | 7.71% | 7.87% |
| B  | 1.12% | 1.49% | 1.89% | 2.67% |

The results shown in Tables 1 and 2 indicate that the compositions of this invention provide immersion (i.e., below grade) water repellent properties which are generally comparable to those of the prior art water repellent up until at least 72 hours, and provide much better water repellent properties than would be the case if no water repellent composition were used.

EXAMPLES 14-16 and COMPARATIVE EXAMPLE C

Examples 14-16 and Comparative Example C illustrate the effect of surfactant on the water repellency of the compositions of this invention and compare the water repellency of a concrete sample coated with the water repellent composition of this invention to the water repellency of an uncoated concrete sample (Comparative Example C). As in Examples 9-13 and Comparative Examples A and B above, the water repellent properties of the various compositions were measured by a modified ASTM C-97-83 method for measuring water absorption of concrete.

In Example 14, the water repellent solution prepared in Example 7 was used at a solids content of 10% by weight and containing 5% by weight of octylphenoxypolyethoxyethanol surfactant.

In Example 15, the water repellent solution prepared in Example 7 was used at a solids content of 10% by weight and containing no surfactant.

In Example 16, the water repellent solution prepared in Example 5 was used at a solids content of 10% by weight and containing 5% by weight of octylphenoxypolyethoxyethanol surfactant.

In Comparative Example C, a water repellent composition was not used and the concrete was left untreated.

The weight data for the coated concrete samples prepared in Examples 14–16 and Comparative Example C are shown in Table 3 below.

TABLE 3

| | Examples 14–16 and Comparative Example C: Weight Values | | | | | |
|---|---|---|---|---|---|---|
| Example No. | Initial Weight (grams) | Weight-24 hour dry (grams) | Weight-24 hour soak (grams) | Weight-48 hour soak (grams) | Weight-5 day soak (grams) | Weight-7 day soak (grams) |
| 14 | 107.3 | 107.7 | 115.1 | 116.0 | 116.2 | 116.3 |
| 15 | 107.3 | 107.8 | 108.7 | 109.3 | 111.9 | 114.4 |
| 16 | 106.8 | 107.0 | 108.4 | 110.2 | 115.5 | 115.8 |
| C | 107.4 | 107.4 | 114.9 | 115.2 | 115.5 | 115.7 |

The water absorption data for the coated concrete samples prepared in Examples 14–16 and Comparative Example C are shown in Table 4 below.

TABLE 4

| | Examples 14–16 and Comparative Example C: Water Absorption Values (% increase in weight) | | | |
|---|---|---|---|---|
| Example No. | After 24 hour soak (%) | After 48 hour soak (%) | After 5 day soak (%) | After 7 day soak (%) |
| 14 | 6.87 | 7.71 | 7.89 | 8.02 |
| 15 | 0.84 | 1.45 | 3.82 | 6.17 |
| 16 | 1.31 | 2.96 | 7.94 | 8.19 |
| C | 7.01 | 7.26 | 7.51 | 7.76 |

The results shown in Tables 3 and 4 indicate that the surfactant improved solubility of the siliconate in water without adversely affecting the water repellent properties of the composition of Example 16 using the silane blend but did adversely affect the water repellency of the compositions containing other types of alkali metal organosiliconates.

What is claimed is:

1. An aqueous composition for rendering masonry and wood surfaces water repellent, comprising by weight:
(A) from about 5 to about 70 parts of a mixture comprising by weight:
(1) from about 5 to about 50 parts of an alkali metal aminoorganofunctional siliconate having the general formula

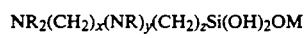

or a quaternary amine salt thereof, wherein each R is independently hydrogen or a monovalent hydrocarbon radical having from 1 to about 6 carbon atoms; M is an alkali metal selected from sodium, potassium, lithium, rubidium, or cesium; x is a number in the range of 0 to 5; y is 0 or 1, with the proviso that if x is 0, y is 1; z is a number in the range of 1 to 6; and x+z is a number in the range of 1 to 6;

(2) from about 95 to about 50 parts of at least one alkali metal organosiliconate selected from (i) monomer compounds of the general formula $R^1Si(OH)_2OM$, or (ii) polymer compounds containing units of the general formula $R^1(OM)SiO_{2/2}$, wherein $R^1$ is a monovalent hydrocarbon radical having from 1 to about 6 carbon atoms, and M is an alkali metal selected from sodium, potassium, lithium, rubidium, or cesium, the sum of (A)(1) and (A)(2) being 100 parts by weight; and
(B) from about 30 to about 95 parts of water, the sum of (A) and (B) being 100 parts by weight.

2. A composition according to claim 1 wherein R is hydrogen; $R^1$ is methyl, ethyl or phenyl; M is sodium or potassium; x is 2; y is 1; and z is 3.

3. A composition according to claim 2 wherein $R^1$ is methyl and M is potassium.

4. A composition according to claim 1 wherein (A)(2) is a potassium methyl siliconate or a blend of potassium methyl siliconate and potassium phenyl siliconate.

5. A composition according to claim 1 wherein (A) is present in an amount of from about 5 to about 25 parts by weight and (B) is present in an amount of from about 95 to about 75 parts by weight.

6. A composition according to claim 5 wherein (A) is present in an amount of from about 5 to about 10 parts by weight and (B) is present in an amount of from about 95 to about 90 parts by weight.

7. A composition according to claim 1 wherein (A)(1) is present in an amount of from about 5 to about 20 parts by weight and (A)(2) is present in an amount of from about 95 to about 80 parts by weight.

8. A composition according to claim 7 wherein (A)(1) is present in an amount of from about 5 to about 10 parts by weight and (A)(2) is present in an amount of from about 95 to about 90 parts by weight.

9. An aqueous composition for rendering masonry and wood surfaces water repellent, comprising by weight:
(I) from about 2 to about 60 parts of a mixture comprising by weight:
(1) from about 5 to about 50 parts of an alkali metal aminoorganofunctional siliconate having the general formula

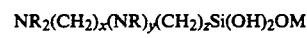

or a quaternary amine salt thereof, wherein each R is independently hydrogen or a monovalent hydrocarbon radical having from 1 to about 6 carbon atoms; M is an alkali metal selected from sodium, potassium, lithium, rubidium, or cesium; x is a number in the range of 0 to 5; y is 0 or 1, with the proviso that if x is 0, y is 1; z is a number in the range of 1 to 6; and x+z is a number in the range of 1 to 6;

(2) from about 95 to about 50 parts of at least one alkali metal organosiliconate selected from (i) monomer compounds of the general formula $R^2Si(OH)_2OM$; (ii) polymer compounds comprising units of the general formula $R^2(OM)SiO_{2/2}$, or (iii) polymer blends comprising by weight:
  (a) from about 70% to about 90% of polymer compounds comprising units of the general formula $(CH_3)(OM)SiO_{2/2}$;
  (b) from about 3% to about 20% of polymer compounds comprising units of the general formula $(CH_3)_2SiO_{2/2}$; and
  (c) from about 5% to about 27% of polymer compounds comprising units of the general formula $[(CH_3)(CH_2)_5](OM)SiO_{2/2}$;
  wherein $R^2$ is a monovalent hydrocarbon radical having from 1 to about 8 carbon atoms; M is alkali metal selected from sodium, potassium, lithium, rubidium, or cesium, the sum of (I)(1) and (I)(2) being 100 parts by weight;
(II) from about 1 to about 20 parts of a water-soluble organic solvent selected from aliphatic monovalent alcohols having from 1 to 4 carbon atoms or ketones having from 3 to 5 carbon atoms; and
(III) from about 20 to about 97 parts of water, the sum of (I), (II), and (III) being 100 parts by weight.

10. A composition according to claim 9 wherein R is hydrogen; $R^2$ is methyl, ethyl, heptyl, octyl, or phenyl; M is sodium or potassium; x is 2; y is 1; z is 3.

11. A composition according to claim 9 wherein (I)(2) is a polymer blend comprising by weight:
(a) from about 75% to about 85% of polymer compounds comprising units of the general formula $(CH_3)(OM)SiO_{2/2}$;
(b) from about 5% to about 10% of polymer compounds comprising units of the general formula $(CH_3)_2SiO_{2/2}$; and
(c) from about 5% to about 20% of polymer compounds comprising units of the general formula $[(CH_3)(CH_2)_5](OM)SiO_{2/2}$;
wherein M is alkali metal selected from sodium, potassium, lithium, rubidium, or cesium.

12. A composition according to claim 9 wherein (I)(2) is a polymer blend comprising by weight:
(a) about 79.5% of polymer compounds comprising units of the general formula $(CH_3)(OM)SiO_{2/2}$;
(b) about 7.0% of polymer compounds comprising units of the general formula $(CH_3)_2SiO_{2/2}$; and
(c) about 13.5% of polymer compounds comprising units of the general formula $[(CH_3)(CH_2)_5](OM)SiO_{2/2}$;
wherein M is alkali metal selected from sodium or potassium.

13. A composition according to claim 9 wherein the organic solvent (II) is an aliphatic monovalent alcohol selected from methanol, ethanol, n-propanol, isopropanol or ethylene glycol, or a ketone selected from acetone, methylethylketone, or 2-pentanone.

14. A composition according to claim 13 wherein the organic solvent (II) is isopropanol or methanol.

15. A composition according to claim 9 wherein (I)(1) is present in an amount of from about 5 to about 20 parts by weight and (I)(2) is present in an amount of from about 95 to about 80 parts by weight.

16. A composition according to claim 15 wherein (I)(1) is present in an amount of from about 5 to about 10 parts by weight and (I)(2) is present in an amount of from about 95 to about 90 parts by weight.

17. A composition according to claim 9 wherein (I) is present in an amount of from about 5 to about 14 parts by weight, (II) is present in an amount of from about 1 to about 10 parts by weight, and (III) is present in an amount of from about 85 to about 94 parts by weight.

18. A composition according to claim 17 wherein (I) is present in an amount of from about 5 to about 9 parts by weight, (II) is present in an amount of from about 1 to about 5 parts by weight, and (III) is present in an amount of from about 90 to about 94 parts by weight.

19. An aqueous composition for rendering masonry and wood surfaces water repellent, comprising by weight:
(A') from about 1 to about 10 parts of a mixture comprising by weight:
  (I') from about 5 to about 50 parts of an alkali metal aminoorganofunctional siliconate having the general formula $NR_2(CH_2)_x(NR)_y(CH_2)_zSi(OH)_2OM$ or a quaternary amine salt thereof, wherein each R is independently hydrogen or a monovalent hydrocarbon radical having from 1 to about 6 carbon atoms; M is an alkali metal selected from sodium, potassium, lithium, rubidium, or cesium; x is a number in the range of 0 to 5; y is 0 or 1, with the proviso that if x is 0, y is 1; z is a number in the range of 1 to 6; and x+z is a number in the range of 1 to 6;
  (II') from about 95 to about 50 parts of an alkali metal organosiliconate polymer blend comprising by weight:
    (a) from about 70% to about 90% of polymer compounds comprising units of the general formula $(CH_3)(OM)SiO_{2/2}$;
    (b) from about 3% to about 20% of polymer compounds comprising units of the general formula $(CH_3)_2SiO_{2/2}$; and
    (c) from about 5% to about 27% of polymer compounds comprising units of the general formula $[(CH_3)(CH_2)_5](OM)SiO_{2/2}$; wherein M is alkali metal selected from sodium, potassium, lithium, rubidium, or cesium, the sum of (A')(I') and (A')(II') being 100 parts by weight;
(B') from about 1 to about 10 parts of a non-ionic surfactant; and
(C') from about 80 to about 98 parts of water, the sum of (A'), (B'), and (C') being 100 parts by weight.

20. A composition according to claim 19 wherein (A') is present in an amount of from about 5 to about 10 parts by weight, (B') is present in an amount of from about 1 to about 5 parts by weight, and (C') is present in an amount of from about 85 to about 94 parts by weight.

21. A composition according to claim 20 wherein (A') is present in an amount of from about 5 to about 7 parts by weight, (B') is present in an amount of from about 1 to about 3 parts by weight, and (C') is present in an amount of from about 90 to about 94 parts by weight.

22. A composition according to claim 19 wherein (A')(II') is a polymer blend comprising by weight:
(a) from about 75% to about 85% of polymer compounds comprising units of the general formula $(CH_3)(OM)SiO_{2/2}$;
(b) from about 5% to about 10% of polymer compounds comprising units of the general formula $(CH_3)_2SiO_{2/2}$; and (c) from about 5% to about 20% of polymer compounds comprising units of the general formula $[(CH_3)(CH_2)_5](OM)SiO_{2/2}$;

wherein M is alkali metal selected from sodium or potassium, and the surfactant (B') is octylphenoxypolyethoxyethanol.

23. A composition according to claim 22 wherein (A')(II') is a polymer blend comprising by weight:
(a) about 79.5% of polymer compounds comprising units of the general formula $(CH_3)(OM)SiO_{2/2}$;
(b) about 7.0% polymer compounds comprising units of the general formula $(CH_3)_2SiO_{2/2}$; and
(c) about 13.5% of polymer compounds comprising units of the general formula $[(CH_3)(CH_2)_5](OM)SiO_{2/2}$;

wherein M is alkali metal selected from sodium or potassium.

24. A masonry or wood substrate coated with the composition of claim 1.
25. A masonry or wood substrate coated with the composition of claim 9.
26. A masonry or wood substrate coated with the composition of claim 19.
27. A method for rendering a masonry or wood substrate water repellent, comprising the step of treating the substrate with the composition of claim 1.
28. A method for rendering a masonry or wood substrate water repellent, comprising the step of treating the substrate with the composition of claim 9.
29. A method for rendering a masonry or wood substrate water repellent, comprising the step of treating the substrate with the composition of claim 19.

* * * * *